US008998324B2

(12) United States Patent
Kitaguchi et al.

(10) Patent No.: US 8,998,324 B2
(45) Date of Patent: Apr. 7, 2015

(54) VEHICLE SEAT

(71) Applicant: Honda Motor Co., Ltd, Tokyo (JP)

(72) Inventors: Asami Kitaguchi, Wako (JP); Harutomi Nishide, Wako (JP); Akihiro Tsuruta, Wako (JP); Toru Inagaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 19 days.

(21) Appl. No.: 13/963,410

(22) Filed: Aug. 9, 2013

(65) Prior Publication Data
US 2014/0042789 A1 Feb. 13, 2014

(30) Foreign Application Priority Data

Aug. 10, 2012 (JP) ................................. 2012-178343

(51) Int. Cl.
*B60N 2/00* (2006.01)
*B60N 2/06* (2006.01)
*B60N 2/68* (2006.01)
*B60N 2/015* (2006.01)
*G01G 19/414* (2006.01)

(52) U.S. Cl.
CPC .. *B60N 2/06* (2013.01); *B60N 2/68* (2013.01); *B60N 2/002* (2013.01); *B60N 2/015* (2013.01); *B60N 2/067* (2013.01); *G01G 19/4142* (2013.01)

(58) Field of Classification Search
CPC ............ B60N 2/06; B60N 2/04; B60N 2/002
USPC ............ 297/344.1; 248/429, 430; 296/65.13, 296/65.15
See application file for complete search history.

(56) References Cited

U.S. PATENT DOCUMENTS

| 3,899,151 | A | * | 8/1975 | Kobrehel ....................... 248/429 |
| 4,666,209 | A | * | 5/1987 | Kazaoka et al. ........... 297/344.1 |
| 5,755,422 | A | * | 5/1998 | Susko et al. .................. 248/430 |
| 6,105,920 | A | * | 8/2000 | Gauger ......................... 248/429 |
| 6,428,039 | B1 | | 8/2002 | Pramler |
| 7,533,932 | B2 | * | 5/2009 | Kawasaki et al. .......... 297/216.1 |

(Continued)

FOREIGN PATENT DOCUMENTS

| EP | 0990565 A1 | 4/2000 |
| JP | 59-48238 A | 3/1984 |

(Continued)

OTHER PUBLICATIONS

Japanese Office Action dated Apr. 15, 2014, issued in corresponding Japanese Patent Application No. 2012-178343 with English summary ( 4 pages).

*Primary Examiner* — Ryan Kwiecinski
(74) *Attorney, Agent, or Firm* — Westerman, Hattori, Daniels & Adrian, LLP

(57) ABSTRACT

A seat main body is mounted on a seat mount base on a vehicle body floor through left and right seat rails. The seat mount base includes left and right side members and a connection member connecting substantially central portions of the side members to each other. The seat rails each include a lower rail and an upper rail. Force sensors are disposed between the side members and the corresponding lower rails. The upper rails are secured to the seat main body. A central region of the connection member, located substantially in a center in a seat width direction, protrudes toward the front compared to joining portions where the connection member is joined to the left and right side members. A space opening toward the rear is formed between the joining portions.

6 Claims, 8 Drawing Sheets

(56) References Cited

U.S. PATENT DOCUMENTS

| | | | |
|---|---|---|---|
| 8,091,675 B2* | 1/2012 | Endo et al. | 180/273 |
| 8,292,346 B2* | 10/2012 | Endo et al. | 296/65.13 |
| 8,844,890 B2* | 9/2014 | Endo et al. | 248/429 |
| 2010/0013284 A1* | 1/2010 | Koga et al. | 297/344.1 |
| 2011/0022274 A1* | 1/2011 | Jefferies et al. | 701/45 |
| 2011/0298265 A1* | 12/2011 | Ngiau | 297/344.1 |

FOREIGN PATENT DOCUMENTS

| | | |
|---|---|---|
| JP | 1-170032 U | 11/1989 |
| JP | 11-1153 A | 1/1999 |
| JP | 2002-500126 A | 1/2002 |
| JP | 2007-78412 A | 3/2007 |

* cited by examiner

VEHICLE SEAT

CROSS REFERENCES TO RELATED APPLICATIONS

The present application claims priority under 35 U.S.C. §119 to Japanese Patent Application No. 2012-178343, filed Aug. 10, 2012, entitled "Vehicle Seat." The contents of this application are incorporated herein by reference in their entirety.

TECHNICAL FIELD

The present disclosure relates to a vehicle seat slidably installed in a vehicle.

BACKGROUND

A vehicle seat in which force sensors are incorporated for measuring the mass of an occupant, an item, or the like on a seat main body is known (see, for example, Japanese Unexamined Patent Application Publication No. 11-1153).

A vehicle seat described in Japanese Unexamined Patent Application Publication No. 11-1153 is a front seat for a vehicle cabin. The vehicle seat includes a seat main body in which an occupant is seated, a pair of left and right seat rails along which the seat main body slides forward and rearward, and a seat mount base through which the left and right seat rails are secured to a vehicle body floor-side member. The seat mount base generally has a substantially H shape in plan view and includes a pair of left and right side members and a connection member. The side members extend in the vehicle body front-rear direction below the left and right seat rails and are secured to a vehicle floor. Central portions of the side members, the central portions being substantially in the center in the front-rear direction, are connected to each other through the connection member. The seat rails include secured rails and movable rails. The secured rails extend in the vehicle body front-rear direction. The movable rails are slidably held by the secured rails. The seat main body is attached to the movable rails.

In this vehicle seat, force sensors are disposed between the left and right side members of the seat mount base and the secured rail portions of the respective seat rails. The mass of an occupant, an item, or the like on the seat main body is input to the force sensors. Wiring cables routed from the force sensors are bundled together on the connection member of the seat mount base. The bundled wiring cables are further routed and connected to an external controller through a connector or the like.

SUMMARY

In the above-described related-art vehicle seat, the connection member of the seat mount base straightly extends in the vehicle width direction, and the central portions of the left and right side members, the central portions being substantially in the center in the front-rear direction, are respectively connected to one and the other end portions of the connection member. For this reason, with the above-described related-art vehicle seat, when the occupant seated in the rear seat stretches his or her leg forward while the seat main body is slid forward, the foot of the occupant may contact the connection member. Thus, a space for the foot of the occupant in the rear seat cannot be sufficiently reliably formed.

In view of the above-described consideration, the present application describes a vehicle seat, with which a space for the foot of the occupant in the rear seat can be sufficiently reliably provided.

The following structure is adopted in a vehicle seat according to the present application.

A vehicle seat according to an aspect of one embodiment includes a seat main body (for example, a seat main body 5 of the embodiment), in which an occupant is seated. The vehicle seat also includes a pair of left and right seat rails (for example, seat rails 8 of the embodiment) each of which includes a secured rail (for example, a lower rail 12 of the embodiment) that extends in a vehicle body front-rear direction and a movable rail (for example, an upper rail 13 of the embodiment) slidably held by the secured rail. The vehicle seat also includes a seat mount base (for example, a seat mount base 7 of the embodiment). The seat mount base includes a pair of left and right side members (for example, side members 18 of the embodiment) each of which extends in the vehicle body front-rear direction under a corresponding one of the pair of left and right seat rails and that are secured to a vehicle body floor-side member. The seat mount base further includes a connection member (for example, a connection member 19 of the embodiment) that connects central portions of the side members located substantially in a center in a front-rear direction to each other. The vehicle seat also includes force sensors (for example, force sensors 24 of the embodiment) disposed between the secured rails and the side members disposed below the corresponding secured rails. In the vehicle seat, a central region of the connection member, located substantially in a center in a seat width direction, protrudes toward a vehicle body front direction compared to joining portions (for example, joining portions 20 of the embodiment) where the connection member is joined to the left and right side members. In the vehicle seat, a space (for example, a space 22 of the embodiment) that is open toward a vehicle body rear direction is formed between the joining portions.

Thus, even when the seat main body is slid forward, interference of the foot of an occupant in a rear seat with the connection member can be prevented from occurring.

In the vehicle seat, wiring cables (for example, wiring cables 25 of the embodiment) connected to the force sensors are preferably held by the connection member, the central region of which protrudes forward.

Thus, a situation, in which the foot of the occupant in the rear seat is brought into contact with the wiring cables, can be prevented. In the above descriptions of several aspects of the present application, some specific elements are indicated as examples by parentheses for the purpose of facilitating understanding and thus should not be regarded as limiting the scope of accompanying claims.

BRIEF DESCRIPTION OF THE DRAWINGS

The advantages of the disclosure will become apparent in the following description taken in conjunction with the following drawings.

DETAILED DESCRIPTION

Figure 1:
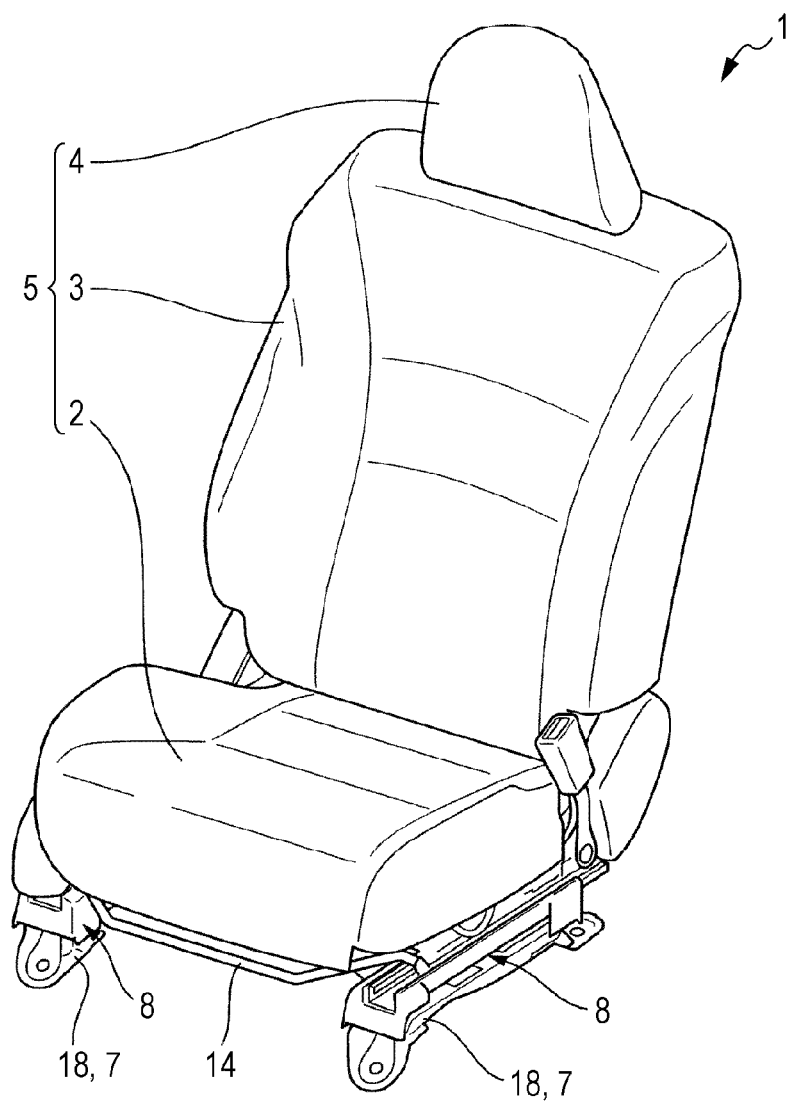
FIG. 1 is a perspective view of a vehicle seat according to an embodiment of the present application.

An embodiment will be described below with reference to the drawings. In the following description, unless otherwise specified, the terms such as up (above), down (below, lower), front (forward, foremost), rear refer to those with respect to a vehicle. In the drawings, arrow FR indicates the front direction of the vehicle, arrow UP indicates the upper direction of the vehicle, and arrow LH indicates the left direction of the vehicle.

FIG. 1 illustrates a vehicle seat (referred to as a "seat 1" hereafter) on the passenger seat side of a left-hand drive vehicle, showing an upper left front thereof.

The seat 1 includes a seat cushion 2, a seat back 3, and a head rest 4. The seat cushion 2 supports the buttocks and the thighs of an occupant. The seat back 3 is tiltably connected to a rear end portion of the seat cushion 2 and supports the waist and the back of the occupant. The head rest 4 is supported at an upper portion of the seat back 3 and supports the head and the neck of the occupant. The seat cushion 2, the seat back 3, and the head rest 4 are included in a seat main body 5 according to the present embodiment.

The seat main body 5 is mounted on a seat mount base 7 through a pair of left and right seat rails 8 such that the seat main body 5 is slidable in the front-rear direction. The seat mount base 7 is mounted on a vehicle body floor-side member (a cross member 40, which will be described later, and the like).

Figure 2:
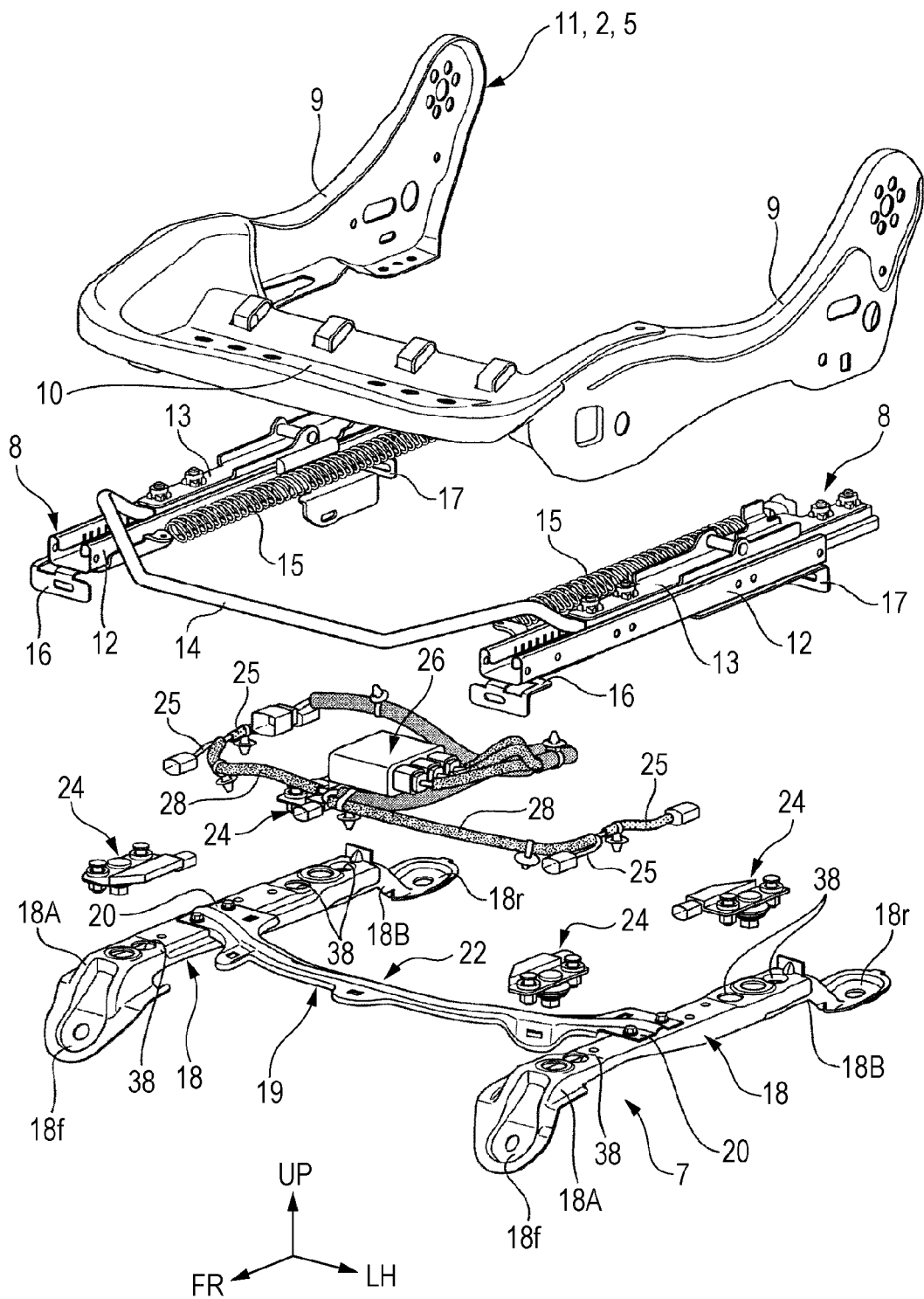
FIG. 2 is an exploded perspective view of part of the vehicle seat according to the embodiment.

FIG. 2 is an exploded perspective view of the seat 1 that mainly illustrates components disposed below the seat cushion 2.

As illustrated in FIG. 2, in the seat cushion 2, a pair of left and right side panels 9, which extend in the vehicle body front-rear direction, are connected to each other by a seat pan 10 on the front side and by a lateral member (not shown) on the rear side, thereby forming a substantially rectangular cushion frame 11.

Each of the left and right seat rails 8 includes a lower rail 12 (secured rail) and an upper rail 13 (movable rail). The lower rails 12 are provided along the vehicle front-rear direction and secured to the seat mount base 7. The upper rails 13 are secured to the respective side panels 9 of the cushion frame 11 at a lower surface side of the seat cushion 2. The lower rails 12 and the upper rails 13 are integrated with each other with sliding members such as rollers disposed therebetween, so that the upper rails 13 are slidable on the respective lower rails 12 in the vehicle front-rear direction. A lock mechanism (not shown) is provided between the lower rail 12 and the upper rail 13 of the respective seat rails 8. The lock mechanism secures the upper rail 13 at a desired slide position.

A common lock release lever 14 is connected to the lock mechanisms of both the left and right seat rails 8. The lock release lever 14 extends in the seat width direction below a front edge portion of the cushion frame 11. When an occupant seated in the seat main body 5 pulls the lock release lever 14 upward, the lock mechanisms of the left and right seat rails 8 can be released. A coil spring 15 is attached between the lower rail 12 and the upper rail 13 of each seat rail 8. The coil spring 15 urges the upper rail 13 forward with respect to the lower rail 12.

In each lower rail 12, a front anchor bracket 16 and a rear anchor bracket 17 are welded to lower surfaces of front and rear edge portions of the lower rail 12, respectively. The front and rear anchor brackets 16 and 17 are used to fasten the lower rail 12 onto the seat mount base 7 with bolts.

Figure 3:
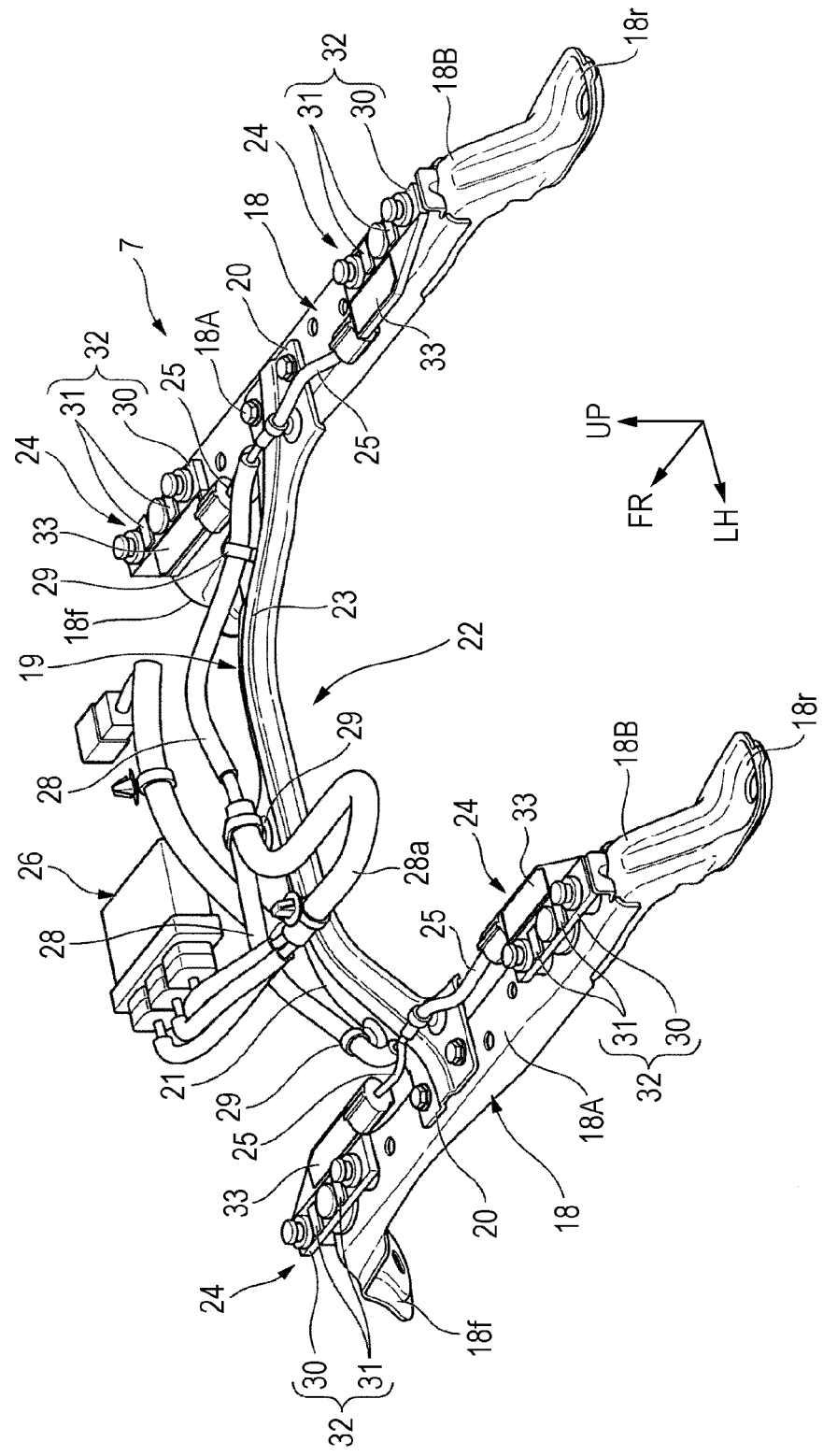
FIG. 3 is a perspective view illustrating a state in which force sensors are attached to a seat mount base of the vehicle seat according to the embodiment.
Figure 4:
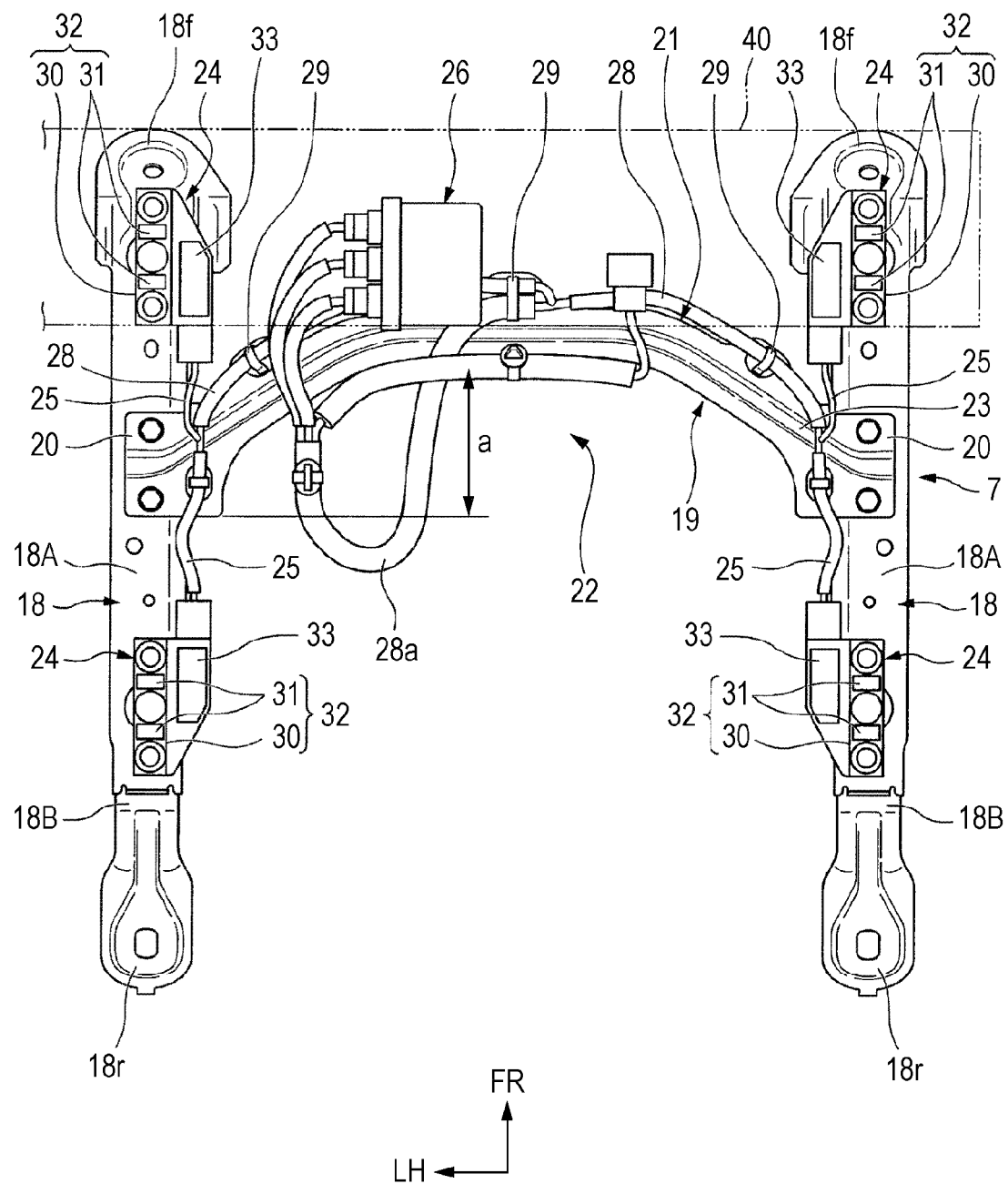
FIG. 4 is a plan view illustrating the state in which the force sensors are attached to the seat mount base of the vehicle seat according to the embodiment.

FIGS. 3 and 4 are respectively a perspective view and a plan view illustrating the details of the seat mount base 7.

As illustrated in FIGS. 3 and 4, the seat mount base 7 includes a pair of left and right side members 18 and a connection member 19. The side members 18 extend in the vehicle body front-rear direction below the left and right seat rails 8, and front and rear end portions of the side members 18 are fastened to the vehicle body floor-side member. Central portions of the side members 18, the central portions being substantially in the center in the front-rear direction, are connected to each other by the connection member 19.

The side members 18 each have a front plate 18A and a rear plate 18B. The front plate 18A is elongated in the vehicle body front-rear direction. The rear plate 18B, which is shorter than the front plate 18A, is superposed on and welded to a lower surface of a rear end portion of the front plate 18A. A fastening portion 18f and a fastening portion 18r are formed on a front end of the front plate 18A and a rear end of the rear plate 18B, respectively. The fastening portions 18f and 18r are each bent downward so as to have a step shape to be fastened to the vehicle body floor-side member. A substantially horizontally extending general portion of the combination of the front plate 18A and the rear plate 18B has a U-shape in section that has an opening facing down, the width of the opening increasing along downward direction.

The connection member 19 is formed by a metal plate elongated in the seat width direction and has joining portions 20, which each have a substantially rectangular shape in plan view, at both ends in the seat width direction. A central region of the connection member 19, the central region being substantially in the center in the seat width direction, protrudes forward by a predetermined length relative to the joining portions 20 located at both ends of the connection member 19 in the seat width direction. Hereafter, in the connection member 19, a region extending between the joining portions 20 is referred to as a connection arm portion 21. A central region of the connection arm portion 21, the central region being substantially in the center in the seat width direction, linearly extends. Regions of the connection arm portion 21 that connect the central region and the left and right joining portions 20 are bent forward so as to have convex shape. Thus, a concave space 22, which is open toward the rear side of the vehicle body, is reliably formed by the connection arm portion 21 between the left and right joining portions 20.

The joining portions 20 of the connection member 19 are superposed on upper surfaces of the left and right side members 18 and integrated with the side members 18 by, for example, fastening bolts or welding. The connection member 19 has a reinforcing rib 23, which has a U-shape in sectional view and continuously extends from the connection arm portion 21 to the left and right joining portions 20.

On the upper surface of each of the left and right side members 18, similar force sensors 24 are attached at positions on the front and rear sides such that the joining portion 20 of the connection member 19 is located between the front and rear force sensors 24. As will be described in detail later, each of the force sensors 24 is connected to the lower rail 12 portion of the seat rail 8 disposed above the side member 18. That is, each of the force sensors 24 is disposed between the side member 18 and the lower rail 12 and measures the mass of the occupant or an item on the seat main body 5 through the seat rail 8 on which the mass operates.

Wiring cables 25 are routed from the force sensors 24 and connected to a sensor controller 26 (electronic control unit (ECU) for a sensor). The sensor controller 26 is attached at a front portion of a lower surface of the cushion frame 11 (front portion of a lower surface of the seat pan 10). The wiring cables 25 routed from two force sensors 24 on a single side member 18 are bundled together on the joining portion 20 at a corresponding one of the both ends of the connection member 19 and held as a bundle 28 on an upper surface of the connection arm portion 21 along a front edge portion of the connection arm portion 21. End portions of the two bundles 28 are bundled together again into a single bundle and connected to the above-described sensor controller 26 with a slack portion 28a formed in the middle of the single bundle. Reference numeral 29 in FIGS. 3 and 4 denotes fastening clips that fasten the bundles 28 on an upper surface of the connection member 19.

The sensor controller 26 is connected to an airbag controller (not shown). In the present embodiment, information about the mass of the occupant or the item on the seat main body 5 measured by the force sensors 24 is transmitted to the airbag controller (airbag ECU). The airbag controller controls the expansion pressure of an airbag in accordance with the received mass information.

Figure 5:
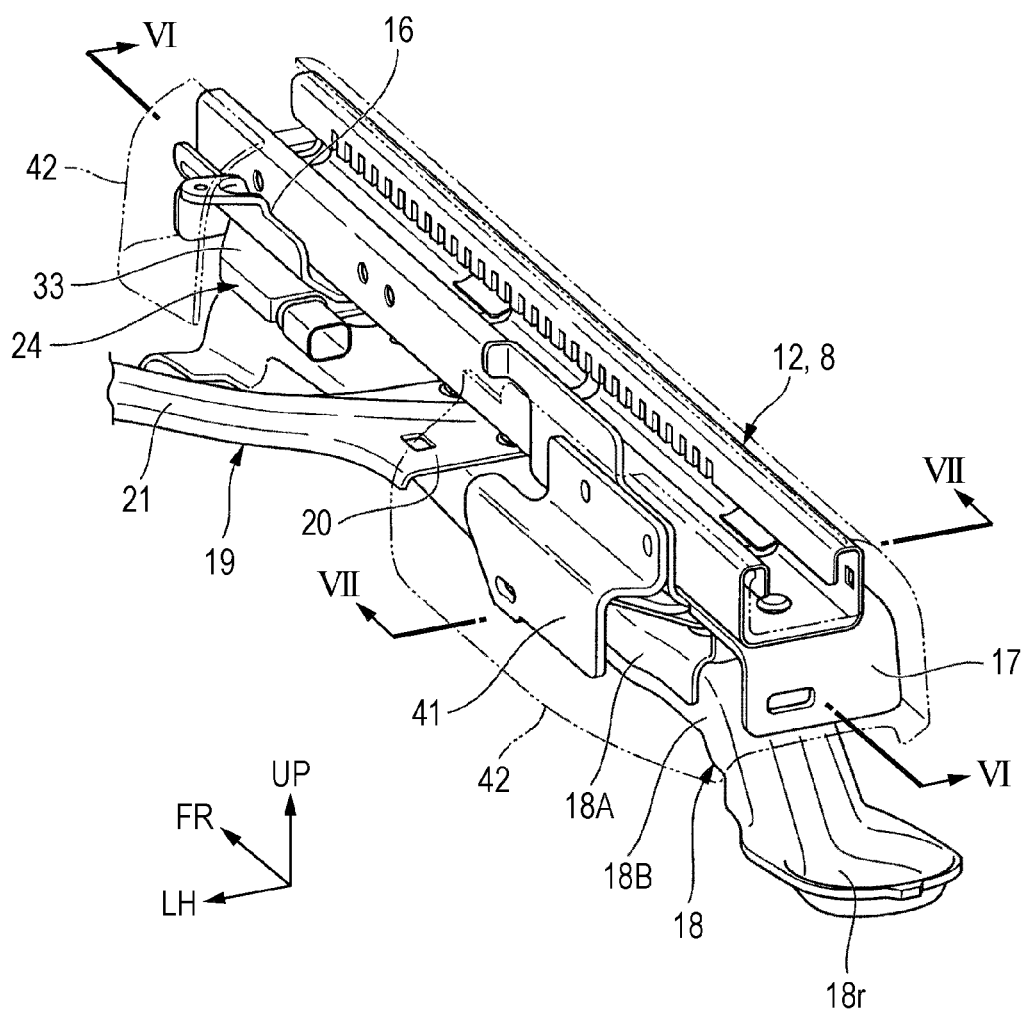
FIG. 5 is a perspective view illustrating a structure of a right-side seat rail and its underneath structure of the vehicle seat according to the embodiment.
Figure 6:
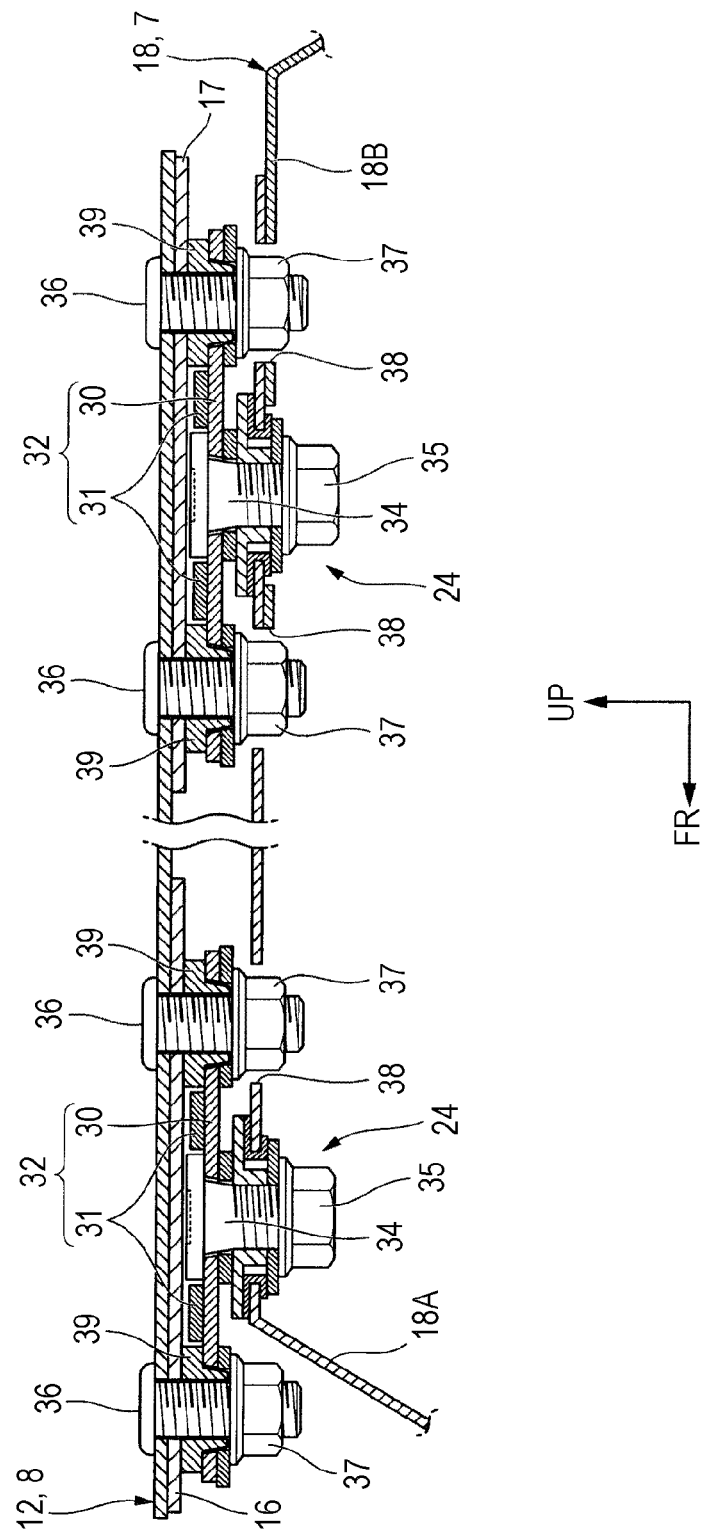
FIG. 6 is a sectional view of the structure illustrated in FIG. 5 taken along line VI-VI in FIG. 5.
Figure 7:
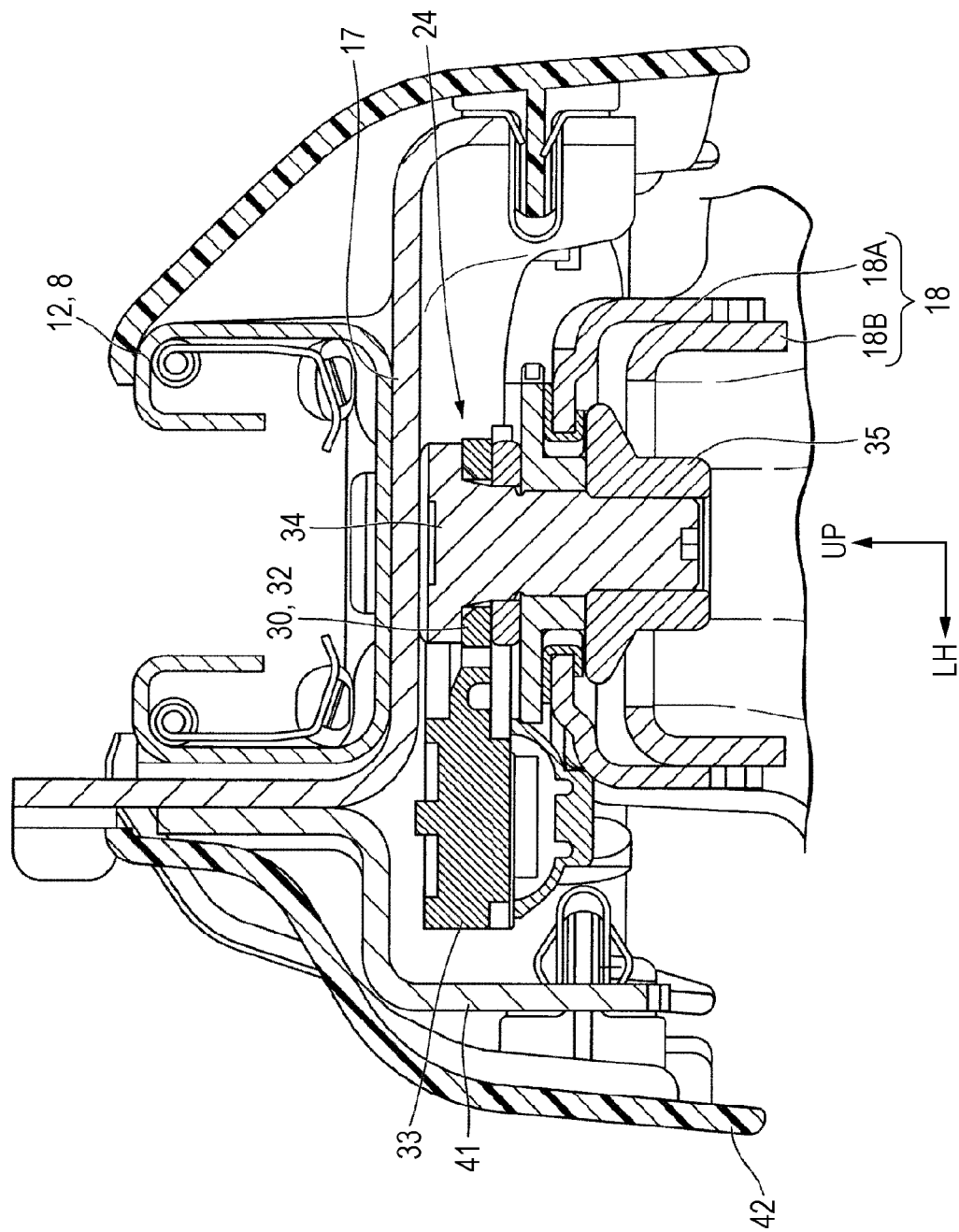
FIG. 7 is a sectional view of the structure illustrated in FIG. 5 taken along line VII-VII in FIG. 5.

FIG. 5 illustrates a structure of the right-side seat rail 8 and its underneath structure. FIGS. 6 and 7 illustrate sections taken along line VI-VI and line VII-VII in FIG. 5, respectively.

As illustrated in FIGS. 3, 4, 6, and 7, each of the force sensors 24 includes a sensor main body 32 and a circuit board unit 33. The sensor main body 32 includes a strap-shaped deformable element 30 and a pair of strain gauges 31, which are joined to an upper surface of the deformable element 30. The circuit board unit 33 processes signals detected by the sensor main body 32. The wiring cable 25 is routed from the circuit board unit 33. As illustrated in FIGS. 6 and 7, a longitudinally central portion of the strap-shaped deformable element 30 of the force sensor 24 is fastened onto a corresponding one of the side members 18 of the seat mount base 7 with a bolt 34 and a nut 35. In this state, as illustrated in FIG. 7, the center of the deformable element 30 in the width direction is positioned in the substantial center in the width direction of the side member 18. The circuit board unit 33 protrudes inward in the seat width direction from an end portion of the side member 18.

As illustrated in FIG. 6, in each of the force sensors 24, which is secured onto a corresponding one of the side members 18 as described above, a front end portion and a rear end portion of the deformable element 30 are fastened to the lower rail 12 portion of a corresponding one of the seat rails 8 with bolts 36 and nuts 37. The heads of the bolts 36 on the front end portion side of the lower rail 12 are caulked to a portion where the lower rail 12 and the front anchor bracket 16 are superposed with each other and the heads of the bolts 36 on the rear end portion side of the lower rail 12 are each caulked to a portion where the lower rail 12 and the rear anchor bracket 17 are superposed with each other. In the present embodiment, tip portions of the bolts 36 and the nuts 37 are disposed below the deformable elements 30 of the sensor main bodies 32. In an upper wall of each of the side members 18, release holes 38 are formed at positions that face the tip portions of the bolts 36 and the nuts 37 in order for the side member 18 to avoid interference with the nuts 37.

Each of the strain gauges 31 on the deformable element 30 is disposed between a fastening portion on the side member 18 side fastened by the bolt 34 and the nut 35 and a fastening portion on the lower rail 12 side fastened by the bolts 36 and the nuts 37. Thus, when the mass of the occupant or the item on the seat main body 5 operates on the seat rails 8, the deformable elements 30 causes strain corresponding to the mass and a signal corresponding to the thus caused strain is detected by the strain gauges 31.

Reference numeral 39 in FIG. 6 denotes spacers disposed between the deformable elements 30 and the front anchor brackets 16 and between the deformable elements 30 and the rear anchor brackets 17.

Furthermore, as illustrated in FIGS. 5 and 7, a metal protective cover 41 is attached to the rear anchor bracket 17, which is welded to the lower rail 12, at an inner end portion in the seat width direction of the rear anchor bracket 17. The protective covers 41 each cover an upper portion and an inner side of the circuit board unit 33 of the force sensor 24 which protrudes inward from the side member 18 in the seat width direction. The protective cover 41 is also used to reduce noise. Furthermore, resin outer covers 42 are attached to the front anchor bracket 16 and the rear anchor bracket 17 at the front and rear of each of the lower rails 12. The outer covers 42 cover the inner and outer sides in the seat width direction of the side members 18 and the lower rails 12.

Figure 8:
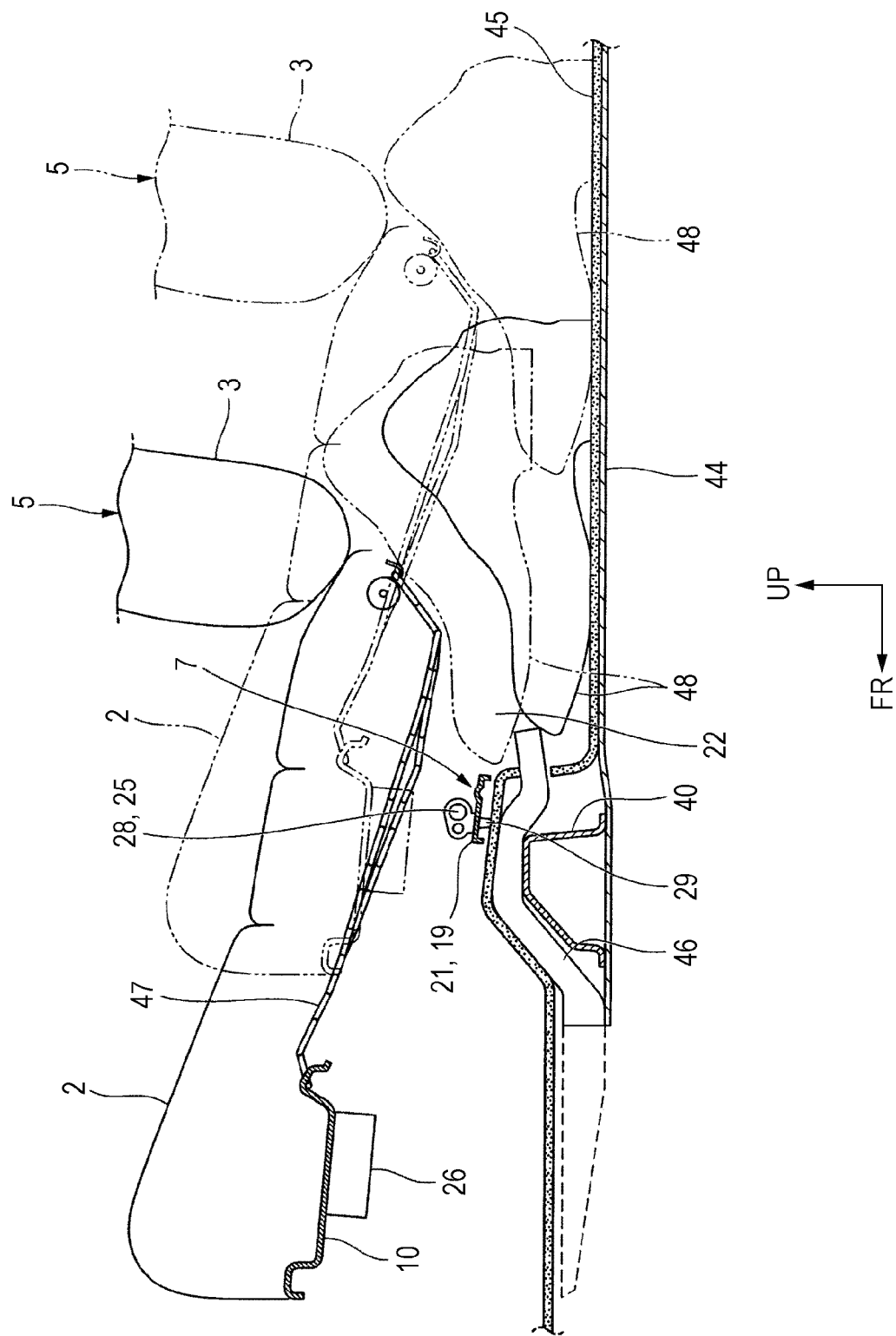
FIG. 8 is a sectional view schematically illustrating a lower portion of the vehicle seat according to the embodiment.

FIG. 8 is a schematic sectional view of the seat 1 and the vehicle body floor-side member disposed below the seat 1 taken along the vehicle body front-rear direction at the substantial center of the seat width direction.

As illustrated in FIG. 8, the cross member 40 that extends in the vehicle width direction is disposed below the seat main body 5. A floor panel 44 is joined to a lower surface of the cross member 40. The cross member 40 and the floor panel 44 are included in the vehicle body floor-side member. Although not illustrated in FIG. 8, front end portions of the left and right side members 18 of the seat mount base 7 are fastened to an upper surface of the cross member 40 with bolts. The floor panel 44 is joined to the cross member 40 on the lower surface side of the cross member 40. Thus, the cross member 40 protrudes upward relative to a general plane of the floor panel 44. For this reason, a floor carpet 45, which covers the upper side of the floor panel 44 and the cross member 40, bulges upward at part thereof located on the cross member 40.

As illustrated in FIGS. 4 and 8, in the connection member 19 of the seat mount base 7, the central region of the connection arm portion 21, the central region being substantially in the center in the seat width direction, is disposed above the cross member 40 so as to be superposed with at least part of the cross member 40 in plan view in the front-rear direction.

Reference numeral 46 in FIG. 8 denotes an air introduction duct that extends over the cross member 40 and protrudes toward the interior of the vehicle cabin. Reference numeral 47 denotes an S-shaped spring that is disposed in the cushion frame 11 and elastically supports the occupant or the item on the seat cushion 2. Reference numeral 48 denotes a foot of the occupant in a rear seat.

In the present embodiment, the central region of the connection arm portion 21 of the connection member 19 protrudes forward so that, when the seat main body 5 is at the foremost position as indicated by the solid lines in FIG. 8, the central region is positioned closer to the front than the rear end portion of the seat cushion 2. Thus, even when the seat main body 5 is at the foremost position, the space 22, which is open to the rear, is secured below the rear portion of the seat main body 5. The space 22 allows the occupant in the rear seat to move the foot 48 thereinto.

In the seat 1 structured as described above, the force sensors 24 are disposed between the left and right side members 18 of the seat mount base 7 and the lower rails 12 of the corresponding seat rails 8. Thus, at any front-rear slide position the seat main body 5 is positioned, the mass of the occupant or the item on the seat main body 5 can be correctly measured. In particular, in the seat 1, the central portions of the left and right side members 18 of the seat mount base 7, the central portions being substantially in the center in the front-rear direction, are connected each other by the connection member 19. Thus, bending or twist of the left and right side members 18 caused by imbalance or the like of loads acting on the seat main body 5 can be prevented by the connection member 19. Accordingly, in the seat 1, stable load measurement can be constantly performed.

In the seat 1 according to the present embodiment, the central region, located substantially in the center in the seat width direction of the connection member 19, protrudes to the front compared to the joining portions 20 disposed on the left and right in the seat width direction. This allows the space 22, which is open toward the rear of the vehicle body, to be secured between the left and light joining portions 20 of the connection member 19. Thus, as illustrated in FIG. 8, even when the seat main body 5 is slid as much as possible to the vehicle body front direction, the occupant in the rear seat can move the foot 48 into the space 22. This can prevents interference of the foot 48 with the connection member 19.

Thus, with the seat 1, a foot space for the occupant in the rear seat can be sufficiently secured.

Also in the seat 1 according to the present embodiment, the bundles 28, into which the wiring cables 25 of the force sensors 24 are bundled, are held on the upper surface of a front edge portion of the connection member 19, the central region of which protrudes forward. Thus, a situation in which the foot 48 of the occupant in the rear seat is brought into contact with the wiring cables 25 can be reliably prevented.

Furthermore, in the seat 1, the central region of the connection member 19, the central region being substantially in the center in the seat width direction, is disposed above the cross member 40, which bulges upward relative to the general plane of the floor panel 44, and superposed with at least part of the cross member 40 in the vehicle body front-rear direction. Thus, when the sole of the foot 48 of the occupant in the rear seat is in contact with an upper surface of the floor carpet 45, the foot 48 is prevented from entering under the connection member 19. Accordingly, interference of the foot 48 with the connection member 19 can be more reliably prevented.

In the seat 1 according to the present embodiment, the metal protective covers 41 are attached to the rear anchor brackets 17 welded to the corresponding lower rails 12. The protective covers 41 cover the inner regions in the seat width direction of the circuit board units 33 of the force sensors 24 provided on the rear portion. Thus, input of shocks or pressure to the circuit board units 33 from the foot 48 of the occupant in the rear seat can be prevented.

Furthermore, in the present embodiment, the resin outer covers 42 cover the inner regions in the seat width direction of the side members 18 and the lower rails 12. Thus, input of shocks or pressure to the circuit board units 33 of the force sensors 24 can be more reliably prevented.

It should be understood that the technology proposed in the present application is not limited to the foregoing embodiment. A variety of design changes are possible without departing from the gist of the proposed technology.

We claim:

1. A vehicle seat comprising:
a seat main body;
a seat mount base secured to a vehicle body floor member, the seat mount base comprising:
a pair of left and right side members, each extending in a vehicle body front-rear direction and secured to the vehicle body floor member, and
a connection member connecting, to each other, respective substantially central portions in the front-rear direction of the side members;
a pair of left and right seat rails disposed between the seat main body and the seat mount base, each comprising:
a secured rail connected to a corresponding one of the left and right side members and extending in the front-rear direction, and
a movable rail slidably held by the secured rail and connected to the seat main body;
force sensors disposed between a respective pair of the secured rail and the corresponding side member; and
a cross member disposed below the seat main body and extending in a vehicle width direction, the cross member being fixedly joined, via a bottom surface thereof, to the vehicle body floor member and bulging upward from the vehicle body floor member,
wherein the connection member includes joining portions, each joined to the respective left and right side members at the respective substantially central portions of the side members, and a central region located at a substantial center in a seat width direction, the central region protruding toward a vehicle body front direction compared to the joining portions such that a space open toward a vehicle body rear direction is formed between the joining portions of the connection member, and
wherein the central region of the connection member is fixedly disposed above the cross member so as to be superposed on at least part of the cross member in the front-rear direction.

2. The vehicle seat according to claim 1,
wherein the force sensors are connected to wiring cables held by the connection member.

3. The vehicle seat according to claim 2,
wherein the wiring cables are held along a front side edge of the connection member.

4. The vehicle seat according to claim 3,
wherein the wiring cables are held on an upper surface of the connection member.

5. The vehicle seat according to claim 1,
wherein the central region of the connection member extends linearly in the vehicle width direction.

6. The vehicle seat according to claim 5,
wherein the connection member further comprises connection arms, each provided continuously between the central region and the respective joining portions, the connection arms are bent toward the vehicle body front direction such that the connection member has a convex shape in a plan view.

* * * * *